Oct. 4, 1955  L. R. HEMSHRODT  2,719,549
TRACTOR-MOUNTED POWER-OPERATED SAWING EQUIPMENT
Filed Sept. 8, 1952  2 Sheets-Sheet 1

Inventor
Lorn R. Hemshrodt

Oct. 4, 1955     L. R. HEMSHRODT     2,719,549
TRACTOR-MOUNTED POWER-OPERATED SAWING EQUIPMENT
Filed Sept. 8, 1952     2 Sheets-Sheet 2
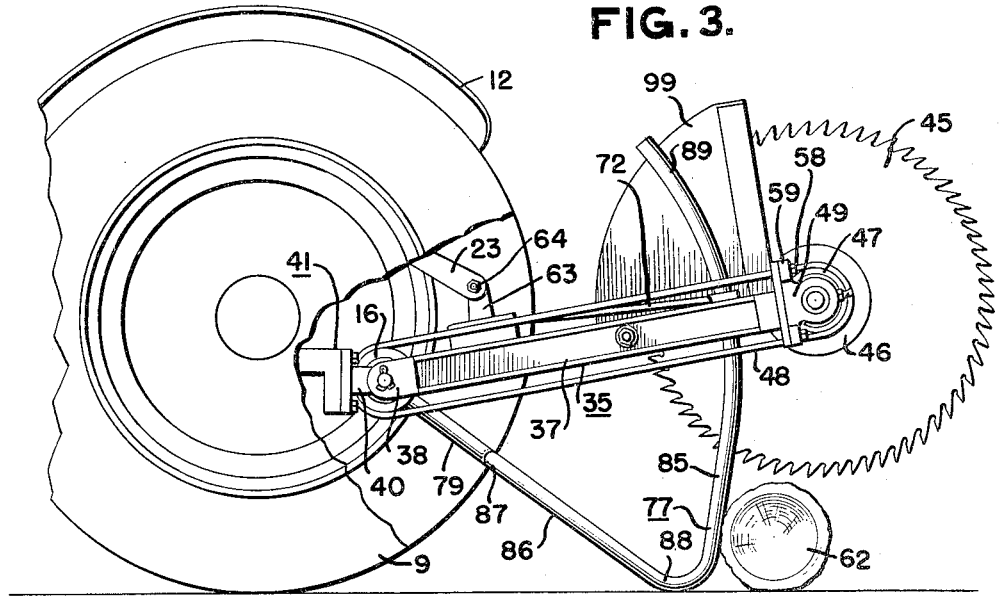
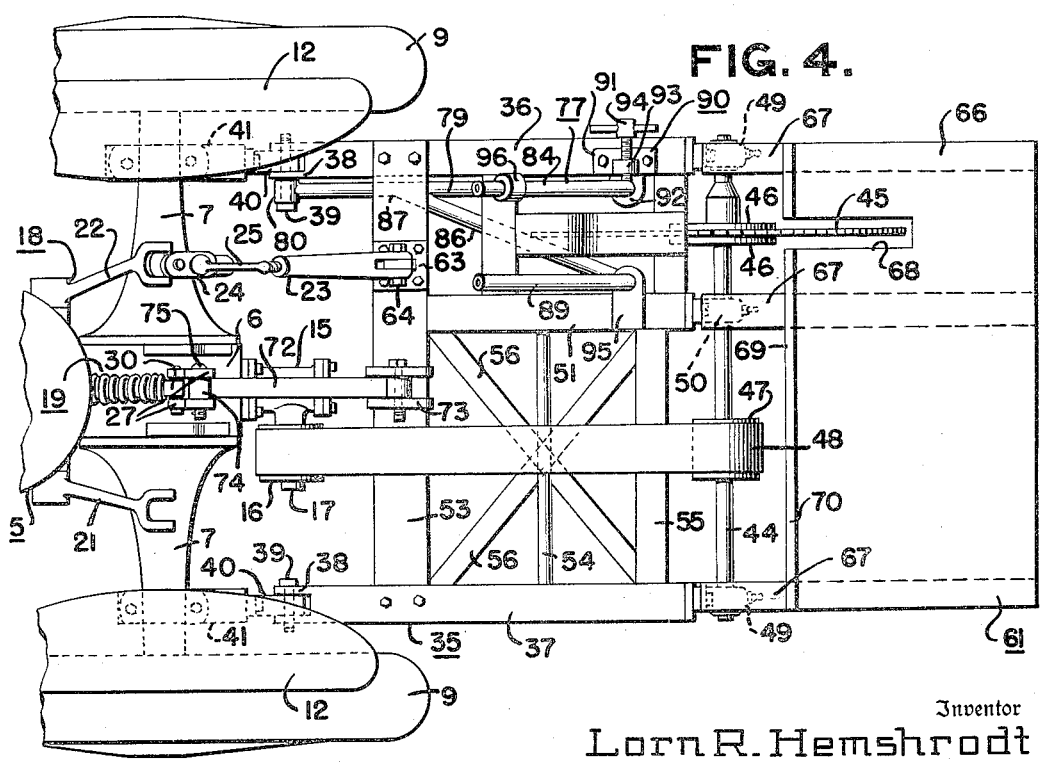
Inventor
Lorn R. Hemshrodt
Attorneys

United States Patent Office 2,719,549
Patented Oct. 4, 1955

2,719,549

TRACTOR-MOUNTED POWER-OPERATED SAWING EQUIPMENT

Lorn R. Hemsbrodt, Richmond, Ohio

Application September 8, 1952, Serial No. 308,395

3 Claims. (Cl. 143—43)

This invention relates to sawing equipment adapted to be mounted on a tractor and operated from the power take-off thereof. Equipment of this general nature has been proposed in the past in which the hydraulic lift of the tractor is used to bodily move the circular saw, while rotating, from one zone to another for felling of trees, and other upstanding plants, and for cross-cutting logs resting upon the ground. The mountings of saws for these purposes are rather complicated in construction, and hence expensive to manufacture, difficult to adjust, and rather hazardous in use. I have found that, in many instances, those engaged in wood cutting have use mainly for equipment useful in cross-cutting logs, lumber, etc., but do not wish to use such equipment for felling trees.

The principal objects of the present invention are to provide equipment of this character which is low in cost of manufacture, sturdy, easily attached and detached with respect to the tractor, and reasonably safe in use and while being transported from place to place, such as from shelter to the field of operation and return, or from one job to another.

Another object is to incorporate in the equipment means capable of adjustment, to act as abutments to keep small logs from rolling while being cut in two by a circular saw let down into the wood from above the logs, and to keep the saw from being lowered to the extent when it might be damaged if it penetrated the ground.

A further object is to provide safety means as a part of the equipment which will selectively hold the saw frame immovable with respect to the tractor frame as when using a table for the work in association with the circular saw, and when transporting the equipment from place to place, with the saw elevated or remote from the ground, thus relieving the hydraulic or other type of lift mechanism as a holding medium when adjustment of the saw to different positions with respect to the ground or work is not required. In the preferred embodiment of the invention I provide a tension link which is carried by the saw frame and adapted for detachable connection with any one of the three sets of companion holes provided in the usual coupling links associated with the draft sensitive mechanism of the character shown in the patent to Ferguson 2,223,002 of November 26, 1940.

Other objects and advantages will appear in the following detailed description of the preferred embodiment of my invention, taken in connection with the accompanying drawings, forming a part of this specification and in which drawings:

Fig. 3 is a fragmentary view in side elevation, looking toward the left side of the tractor, and showing the end of a small log engaging a stop forming a part of the present invention, and with the lower edge of the circular saw in close proximity to the log.

Fig. 4 is a top plan view showing the tractor rear portion and the equipment as in Fig. 1, to be used as a table saw.

Figure 1:
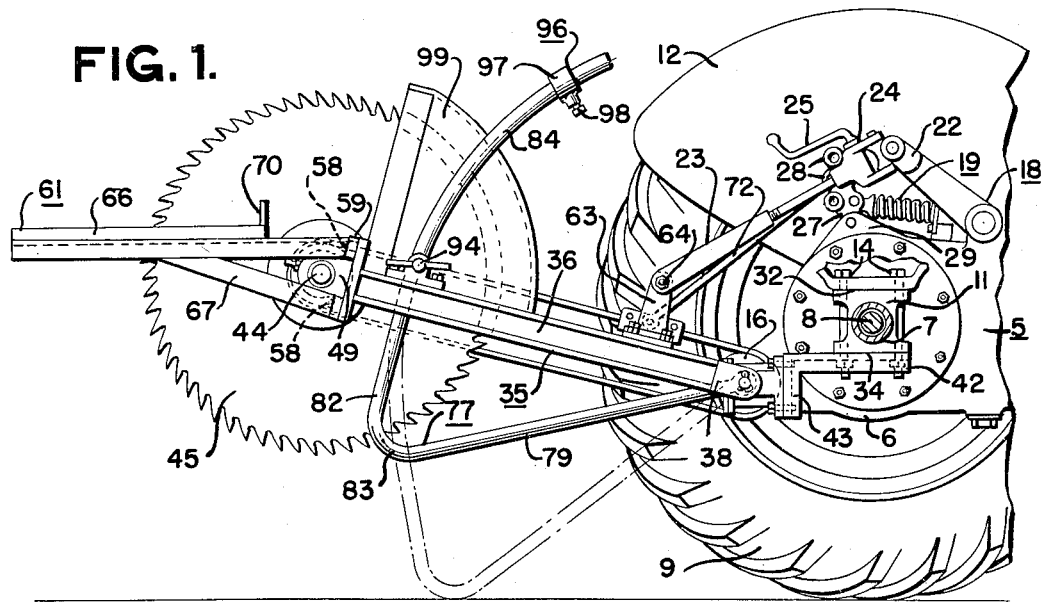
Fig. 1 is a view partly in side elevation and partly in vertical section, showing a portion of a tractor and the sawing equipment attached thereto, to be used as a table saw.

In the drawing only the rear or pertinent portion of a power tractor 5 is shown, it being of the usual or commercial design, including a differential casing 6; housings 7 extending laterally at each side of casing 6 containing live axles 8 on which are mounted the usual ground wheels 9, the extremity of each housing 7 having an enlargement 11, supporting a fender 12, as by bolts 14; a power take-off 15 including a drive pulley 16 on a transverse axle 17 thereof; and an implement lift mechanism 18 of the hydraulic type and draft sensitive mechanism 19 of the type substantially as disclosed in Patents 2,118,181 and 2,223,002 to H. G. Ferguson. The mechanism 18 includes a control hand lever 20, lift arms 21 and 22 and a link 23 pivotally connected to the arm 22 and adjustable as to length thru any suitable device 24 having a control hand crank 25, such as is commonly used in the art, and the mechanism 19 includes upstanding coupling links 27 provided with a plurality of sets of openings 28 and pivoted to lugs 29 on the casing 6, and the usual spring biased rod 30 connected to the links 27 in the well known manner, and to safety mechanism, not shown in the drawing, to stop the tractor if the coupling links 27 are pushed forwardly to a predetermined degree. The enlargement 11 is of a type where an upper horizontal flat surface 32 is provided upon which a flange 33 of the fender 12 rests, and a lower flat surface 34 parallel to the surface 32 which normally have abutted thereagainst lock washers and nuts, not shown in the drawing, for the bolts 14.

The foregoing description relates to characteristics of the current Ford tractors equipped with the Ferguson implement lift and draft sensitive mechanism disclosed in the aforesaid Ferguson patents, but it is to be understood that the present invention is applicable to other makes and models of tractors without departing from the spirit of the invention as set forth in the claims.

The sawing equipment, according to the present invention includes, in the example shown, a saw frame 35 including parallel side arms 36 and 37 provided with bearings 38 at companion ends for pivotal connection, as by pins or bolts 39, to the bearings 40 of brackets 41 attached to the tractor at the enlargements 11 of the axle housings 7, by means of the fender bolts 14. The brackets 41 are of L-shape, the longer leg 42 of each engaging the underface 34 of its respective enlargement 11 of the tractor axle housing, and the shorter leg 43 carrying the bearing 40. These brackets are constructed and arranged in such manner that the bearings 40 are coaxial with the drive axle 17.

The frame 35 supports, at its portion remote from the bearings 38, a driven mandrel or shaft 44 on which is secured a circular saw 45 between disks or collars 46, and a pulley 47 adapted to be rotated by an endless belt 48, trained about it and the pulley 16. The mandrel 44 is supported by outer bearings 49 attached to the free ends of side arms 36 and 37, and by an intermediate bearing 50 attached to the end of a bar 51 located adjacent and parallel to the arm 36 but spaced therefrom a distance suitable to accommodate a portion of the saw 45 for free rotation therebetween. The frame 35, in the example shown, also includes a cross beam 53 connected to the arms 36 and 37 and the bar 51; and suitable cross bracing members 54 and 55 and diagonal bracing 56. The bearings 49 and 50 are secured to their respective frame members by bolts 58 extending thru pedestals 59 of the bearings, and into the ends of the respective frame members.

Figure 2:
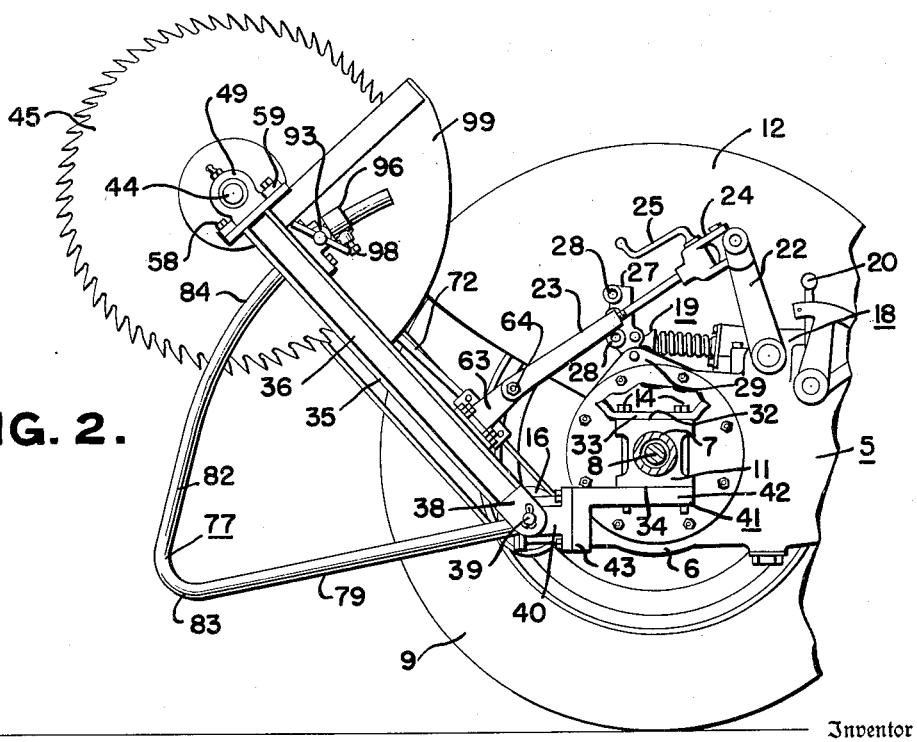
Fig. 2 is a similar view, but showing only those parts needed for cross-cutting logs, etc., but with the parts elevated as for movement of the tractor and equipment from place to place, during log sawing operations.

Thus it may be observed that the saw frame 35 may be swung about the axis of the drive shaft 17 without loosening or tightening of the belt 48; that the frame may be moved to a highly elevated position as shown in Fig. 2, when the saw is remote from the ground, for safe travel from place to place; may be lowered somewhat to an appropriate position where the saw 45 may be conveniently used with an attachable table 61, to be subsequently described more in detail, as shown in Fig. 1; and may be further lowered to progressively cross-cut thru a log 62 resting upon the ground as shown in Fig. 3.

The saw frame 35 may be conveniently raised and lowered, and minutely adjusted to a fixed position by use of the lift mechanism 18. To accomplish this, the end of link 23 thereof, opposite the adjusting device 24, is pivotally and detachably connected to a bearing 63 by a bolt 64, the bearing being secured upon the cross beam 53 as shown in Fig. 4. By manipulation of the hand lever 20 of mechanism 18, the saw frame may be raised and lowered and brought to rest at a desired location, and further minute adjustment as to location may be accomplished by manipulation of the hand crank 25 of mechanism 18.

The table 61 comprises a flat service portion 66 and brackets 67 secured to the underside of the portion 66 adapted for detachable connection with the bolts 58. The service portion is provided with a slot 68 (Fig. 4) open to its rear edge 69 for accommodation of the saw and may be provided with a fence 70 upstanding along the edge 69 to limit the extent to which work may be fed on the table toward the mandrel of the saw.

In order not to place reliance on the lift mechanism 18 to hold the saw frame in suitable position for use with table 61, I provide a tension link 72 pivotally connected to the saw frame 35, as by a bracket 73 mounted upon the cross beam 53, the link at its end remote from the bracket having an eye portion 74 adapted to align with any one of the sets of openings 28 in the coupling links 27 and receive therein a pin 75 detachably connecting the link 72 to the links 27 of the draft sensitive mechanism 19. For instance, if the tractor is on level ground and the zone where the operator is to work is above substantially the same level ground, the link 73 is connected at the central companion openings 28 of the links 27, but if the tractor is headed upwardly on sloping ground, the link 73 is connected at the upper set of companion openings 28 of the links. If the tractor is headed downwardly on sloping ground, the link 73 is connected to the links 27 at the lower set of companion openings 28. While the table may be initially disposed in the approximate desired position by manipulation of lever 20, fine adjustment to align the opening of eye portion 74 of link 72 with the selected openings of the links 27 may be accomplished by manipulation of the crank 25, and to facilitate the placing of the pin 75.

Another important feature of my invention is the provision of stop mechanism 77 having various functions. It includes, in the example shown, a first arm 79 pivotally connected to the saw frame by a bearing 80, at one end receiving the frame attaching pin 39 of arm 36, so that the arm may extend downwardly toward the zone of the saw 45 or toward or in engagement with the ground, as shown in Figs. 1 and 3, respectively; a second arm 82 extending upwardly from and connected to the free end portion of arm 79, as by minor, arcuate juncture portion 83, the arm 82 having a major arcuate portion 84 struck at a radius from the axis of pin 39; and a third arm 85 connected to the first arm at any suitable point therealong, the third arm including a diagonal portion 86 (Fig. 4) extending downwardly and inwardly from its juncture 87 with arm 79, a minor arcuate portion 88 substantially parallel to arcuate portion 83, and a major arcuate portion 89 parallel to arcuate portion 84. The arms 82 and 85 are located so as to have their major arcuate portions one to each side of the plane of the saw.

The stop mechanism 77 also includes a clamp 90 (Figs. 2 and 4), in the example shown, consisting of a brace 91 secured upon arm 36, and including an embracing portion 92 thru which the arcuate portion of arm 82 extends and a lug 93 thru which extends a set screw 94 which may be turned tight against arcuate portion 84 to bind it against the embracing portion 92 as shown in Fig. 4.

In the example shown, the stop mechanism 77 also includes, a guide 95 in slidable embracing relationship to the arcuate portion 89 of arm 85, this guide being secured upon the bar 51; and an abutment 96 adjustable along the arcuate portion 84 of arm 82. Thus abutment 96 comprises a collar 97 and a set screw 98 which may be turned tight against the arcuate portion 89 of arm 85.

In use, the stop mechanism 77 may be used to assist in supporting the table 61 in the desired position, as shown by dot and dash lines in Fig. 1, when the minor arcuate portions 83 and 88 rest upon the ground and the set screw 94 is turned tight. The mechanism 77 may be so adjusted that the saw frame may move relative to the stop mechanism while the latter acts as a stop to prevent a log 62, resting upon the ground from rolling, while being cross-cut, as is obvious from an inspection of Fig. 3, at which time the set screw 94 is loose. According to this arrangement, if the saw frame is elevated to a position where the tractor and equipment is moved to another field of operation, the lifting of the saw frame to an extreme elevated position will result in the abutment 96 contacting the lug 93, and lifting the stop mechanism 77 out of contact with the ground, as shown in Fig. 2. If desired, the control hand crank 25 of device 24 may be manipulated so as to render the effective length of link 23 such that when control lever 20 sets the implement lift mechanism 18 in operation to lower the saw, the lift arms 22 will reach the end of their downward stroke just before the periphery of the saw closely approaches the ground therebeneath, so as to prevent damage to the saw. Or, the stop mechanism 77 may be used for this safety purpose by turning set screw 94 tight at a time when the minor arcuate portions 83 and 88 are in a plane lower than the lowermost portion of the periphery of the saw, as shown in full lines, Fig. 1 of the drawing.

If desired, the equipment may include any suitable guard 99 for the saw located preferably about the upper rear portion of the saw as shown in Fig. 3, to prevent sawdust from being thrown toward the operator, not shown in the drawings, while manipulating the lever 20 for cross cutting operations.

It is believed that the several advantageous features of the present invention will be clear from the foregoing detailed description, however, it may be pointed out that very little effort is required to detach the sawing equipment from the tractor when the use of the former is not desired, as when using the tractor with trailing agricultural equipment. For instance, the brackets 41 may remain on the tractor after the pins or bolts 39 have been removed, and by disconnecting the link 23, from the saw frame, as by detaching the bolt 64, the entire sawing equipment may be set aside until it is again required.

I claim:

1. In combination with a tractor of the type including a power take-off; sawing equipment including a saw frame pivotally connected to the tractor to swing upwardly and downwardly about a horizontal axis, a mandrel and circular saw thereon, carried by said frame, with the axis of the mandrel parallel to said horizontal axis, motion transmitting means operatively connected with said power take-off and mandrel for rotating the saw by operation of said power take-off, and stop mechanism including a first arm pivoted to said saw frame coaxial with said horizontal axis and extending downwardly therefrom toward rear lower portion of the zone of said saw, a second arm extending upwardly from and connected to the free end portion of said first arm, said second arm including an arcuate portion, struck at a radius from said horizontal axis and located in a zone between said mandrel and the pivotal connection of the saw frame with the tractor, a clamp carried by the saw frame, and operable to selectively hold said second arm in an adjusted position with respect to the saw frame, or free it for movement with respect to said frame, whereby said stop mechanism may act to limit the extent to which the saw frame may be swung downwardly when said clamp is set to hold said second arm, or act to stop logs from rolling on the ground while being cross-cut upon lowering the saw frame and saw when the clamp is released from said second arm.

2. The combination as set out in claim 1 in which the stop mechanism also includes an abutment adjustable along the upper portion of said second arm and is adapted to engage said clamp when the saw frame is swung upwardly to a highly elevated position and thereby carry said arms with it throughout a portion of the upwardly swinging movement of the saw frame.

3. The combination as set forth in claim 1 in which the stop mechanism has said second arm to one side of the plane of the saw and has a third arm connected for movement with said first arm and the third arm is located to the other side of the plane of the saw and has an arcuate portion paralleling the arcuate portion of said second arm.

References Cited in the file of this patent

UNITED STATES PATENTS

| | | |
|---|---|---|
| 1,323,923 | Sparing | Dec. 2, 1919 |
| 1,808,453 | DeKoning | June 2, 1931 |
| 2,118,181 | Ferguson | May 24, 1938 |
| 2,223,002 | Ferguson | Nov. 26, 1940 |
| 2,330,996 | Rivers | Oct. 5, 1943 |
| 2,342,306 | Silver | Feb. 22, 1944 |
| 2,436,504 | Duncklee | Feb. 24, 1948 |
| 2,440,422 | Westmoreland | Apr. 27, 1948 |

OTHER REFERENCES

Popular Science Magazine for September 1950, page 225.